United States Patent
Adams et al.

(10) Patent No.: US 8,850,383 B2
(45) Date of Patent: *Sep. 30, 2014

(54) NAVIGATION-INDEPENDENT ACCESS TO ELEMENTS OF AN INTEGRATED DEVELOPMENT ENVIRONMENT (IDE) USING UNIFORM RESOURCE LOCATORS (URLS)

(75) Inventors: Gregory D. Adams, Dunrobin (CA); Dorian Birsan, Toronto (CA); Allen Vi Cuong Chan, Markham (CA); Phil Coulthard, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 320 days.

This patent is subject to a terminal disclaimer.

(21) Appl. No.: 13/465,157

(22) Filed: May 7, 2012

(65) Prior Publication Data
US 2012/0221997 A1    Aug. 30, 2012

Related U.S. Application Data

(63) Continuation of application No. 12/016,907, filed on Jan. 18, 2008, now Pat. No. 8,201,138.

(51) Int. Cl.
*G06F 9/44* (2006.01)
(52) U.S. Cl.
CPC ........................... *G06F 8/00* (2013.01)
USPC ........................................................ 717/100
(58) Field of Classification Search
CPC .................................................. G06F 8/00
USPC ........................................................ 717/100
See application file for complete search history.

(56) References Cited

U.S. PATENT DOCUMENTS

| | | | |
|---|---|---|---|
| 7,024,658 B1 | 4/2006 | Cohen et al. | |
| 7,412,686 B2 * | 8/2008 | Guthrie et al. | 717/102 |
| 2001/0011365 A1 * | 8/2001 | Helfman | 717/1 |
| 2004/0158811 A1 * | 8/2004 | Guthrie et al. | 717/103 |
| 2006/0047653 A1 | 3/2006 | Vaidyanathan et al. | |
| 2007/0028170 A1 | 2/2007 | Wessling et al. | |
| 2009/0063406 A1 * | 3/2009 | Golander et al. | 707/3 |

* cited by examiner

*Primary Examiner* — Qing Chen
(74) *Attorney, Agent, or Firm* — Patents on Demand P.A.; Brian K. Buchheit; Scott M. Garrett

(57) ABSTRACT

The present invention discloses a navigation-independent system for accessing the elements of an integrated development environment (IDE) using uniform resource locators (URLs). Such a system can include a set of URL-accessible IDE elements, a set of URLs, and a URL operation tool. The set of URL-accessible IDE elements can represent a multitude of functional objects accessible by the IDE. Each URL-retrievable IDE element can include a set of meta data that contains key words describing the URL-accessible IDE element. Each URL in the set of URLs can be configured to provide a navigation-independent mechanism for accessing a corresponding URL-accessible IDE element. The URL operation tool can be configured to associate URLs with URL-accessible IDE elements and execute URL operations on the URL-accessible IDE elements.

17 Claims, 3 Drawing Sheets

US 8,850,383 B2

NAVIGATION-INDEPENDENT ACCESS TO ELEMENTS OF AN INTEGRATED DEVELOPMENT ENVIRONMENT (IDE) USING UNIFORM RESOURCE LOCATORS (URLS)

CROSS-REFERENCE TO RELATED APPLICATIONS

This application is a continuation of U.S. patent application Ser. No. 12/016,907, filed Jan. 18, 2008 (now U.S. Pat. No. 8,201,138), which is incorporated herein in its entirety.

BACKGROUND

The present invention relates to the field of software integrated development environments (IDEs).

A software integrated development environment (IDE) is a powerful tool used by software developers when creating software applications. An IDE provides a developer with a multitude of timing saving features in a centralized location. For example, a typical IDE can include debugging functions, automated code generation, code element wizards, visual and/or color-coded user-friendly interfaces, and such. Thus, the use of an IDE represents increased efficiency and productivity.

However, as software applications and programming languages become more complex, so do IDEs. More features are required to accommodate new models, new objects, and new functions. This increase in features can make it more difficult for a developer to find a desired feature or existing element of the IDE. For example, an increase in features can result in the nesting or restructuring of menu items.

Additionally, a developer must remember the exact steps for accessing the desired element. With many features of the IDE used during development, a developer can spend more time searching for a feature instead of using the feature. This further hinders the ability for developers to effectively communicate the location of features to other members of their development team. Further, the elements of a conventional software IDEs are not searchable. Search functions are typically only available for topics contained in a "Help" menu.

BRIEF SUMMARY

The present invention can be implemented in accordance with numerous aspects consistent with material presented herein. For example, one aspect of the present invention can include a navigation-independent system for accessing the elements of a software integrated development environment (IDE) using uniform resource locators (URLs). Such a system can include a set of URL-accessible IDE elements, a set of URLs, and a URL operation tool. The set of URL-accessible IDE elements can represent a multitude of functional objects accessible by the software IDE. Each URL-retrievable IDE element can include a set of meta data that contains key words describing the URL-accessible IDE element. Each URL in the set of URLs can be configured to provide a navigation-independent mechanism for accessing a corresponding URL-accessible IDE element. The URL operation tool can be configured to associate URLs with URL-accessible IDE elements and execute URL operations on the URL-accessible IDE elements. Further, a set of user selected URLs associated with IDE elements can be specified within a Web page to create a custom IDE interface.

Another aspect of the present invention can include a navigation-independent method for accessing the elements of a software IDE using URLs. Such a method can begin with the receipt of a user-entered search string. Meta data for a set of URL-accessible IDE elements can be queried for matches to the user-entered search string. When matches exist, a search results list can be generated and presented. A user-selection of a URL-accessible IDE element from the search results list can then be received. This can be followed by the receipt of a user-selection of a URL operation. The user-selected URL operation can then be executed within the software IDE.

Still another aspect of the present invention can include a method for applying a Web-based paradigm to a conventional software IDE. Such a method can begin with the definition of a URL scheme. URLs can be created in accordance with the URL scheme to represent navigation-independent access mechanisms. Each URL can then be associated with an IDE element of a software IDE to create URL-accessible IDE elements. A set of URL operations that utilize the URL of URL-accessible IDE elements can then be implemented within the software IDE.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

DETAILED DESCRIPTION

What is needed is a solution that allows the elements of an IDE to be structured in such a way that they are searchable and accessible independent of menu navigation. That is, the solution would apply a Web-based paradigm to the elements of the IDE by labeling each element with a uniform resource locator (URL). Ideally, such a solution would leverage the capabilities of a Web-based search engine as well as the functions typically associated with URLs.

Embodiments of the present invention discloses a solution for providing access to elements of a software integrated development environment using uniform resource locators (URLs). This solution can allow a URL scheme to be developed to define the various elements that can be accessed by the IDE. The elements of the IDE can then be labeled with URLs, creating URL-accessible IDE elements. A search engine can be utilized to query meta data to generate and present a search results list of URL-accessible IDE elements that match a user-entered search string. Typical URL functions can then be performed upon the URL-accessible IDE elements, such as bookmarking and launching. A URL-accessible IDE element can be launched from the search results list, which directly invokes the element without the standard navigation of the software IDE. Additionally, developers and/or end users can assemble a set of URLs for IDE elements to create a customized "page" in the IDE, effectively customizing an interface of the IDE.

Figure 1:
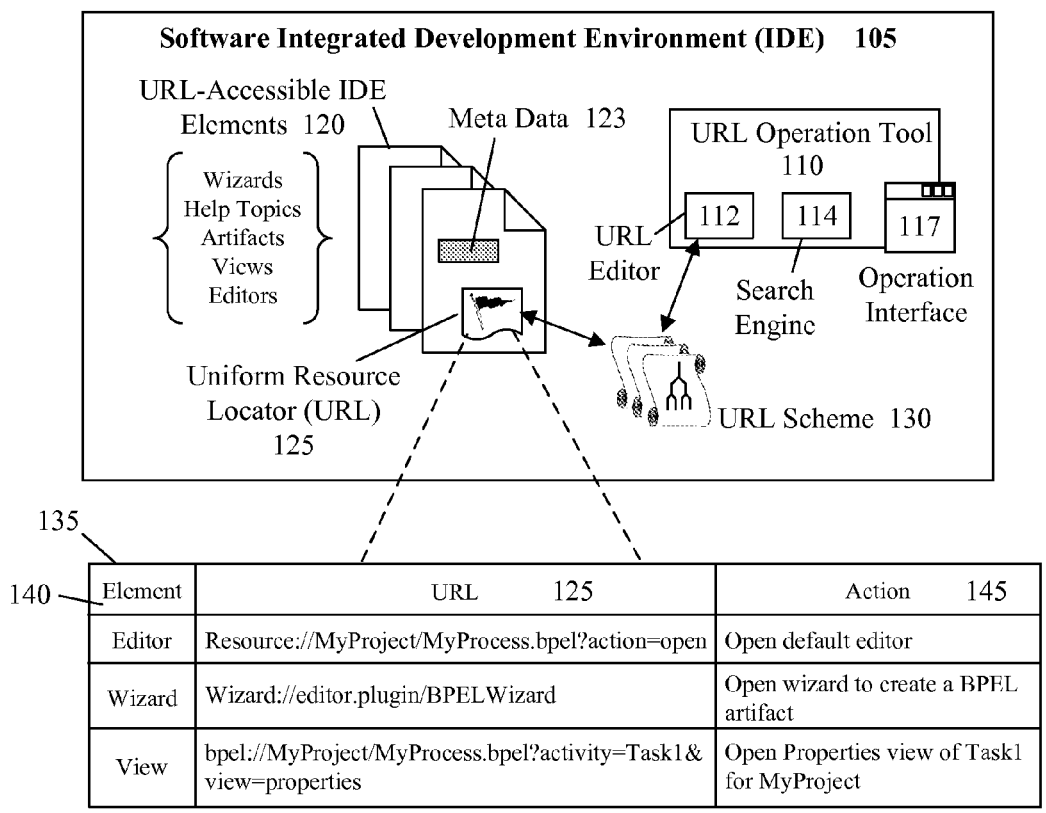
FIG. 1 is a schematic diagram of a system for providing navigation-independent access to the elements of a software integrated development environment (IDE) using uniform resource locators (URLs) in accordance with embodiments of the inventive arrangements disclosed herein.

FIG. 1 is a schematic diagram of a system 100 for providing navigation-independent access to the elements 120 of a software integrated development environment (IDE) 105 using uniform resource locators (URLs) 125 in accordance with embodiments of the inventive arrangements disclosed herein. In system 100, the URL operation tool 110 can perform a variety of URL operations upon the set of URL-accessible IDE elements 120 within the software IDE 105.

The software IDE 105 can represent a software application used for software development. It should be noted that the software IDE 105 can include additional components not shown in FIG. 1 that are not central to the present invention. As such, the software IDE 105 can include a set of URL-accessible IDE elements 120, a URL operation tool 110, and a URL scheme 130.

The set of URL-accessible IDE elements 120 can represent a variety of existing functional objects utilized by the software IDE 105 for software development activities that have an associated URL 125. Items contained within the set of URL-accessible IDE elements 120 can include, but are not limited to, wizard creation tools, graphical user interfaces (GUIs), help topics, artifacts, display views, and the like.

A URL-accessible IDE element 120 can include a set of meta data 123 and a URL 125. The meta data 123 and URL 125 can exist at a level external to the operational code of the URL-accessible IDE element 120. That is, the meta data 123 and URL 125 can be located such that they are accessible without invoking their associated URL-accessible IDE element 120.

The set of meta data 123 can represent a set of key word descriptors for the URL-accessible IDE element 120. The set of meta data 123 can be a existing feature provided by the software IDE 105. For example, help topics typically already have a set of meta data to accommodate a search capability for the help window. In the case where the URL-accessible element 120 does not have existing meta data, a meta data editor (not shown) can be included within the URL operation tool 110.

The URL 125 can represent a syntactically uniform identifier defining the URL-accessible IDE element 120 and its location to provide access to the URL-accessible IDE element 120 that is independent of the navigation provided by the software IDE 105. For example, a GUI wizard 120 can be invoked via its URL 125 instead of the standard menu commands provided by the software IDE 105.

It is important to emphasize that conventional software IDE applications do not include a means by which to search items, other than help topics. Conventional software IDE applications lack a framework that allows for flexible and intuitive access to vital features. The use of URLs 125 in the present invention provides a framework that incorporates the ease of Web-based functionality into a non-Web-based environment; providing access to features without becoming lost in a rigid navigation system.

Advantageously, associating URLs 125 to IDE elements 120 permits Web based standards and standard Web searching tools to be leveraged. For example, a set of URLs associated with elements 120 can be specified within a browser renderable Web page. This page can be customized at will, effectively permitting a user to create a custom IDE interface for environment 105 using Web page creation tools and techniques. As Web search tools change and improve, system 100 can automatically benefit. Additionally, use of open standards permits the system 100 to be easily extended, which can important when working with a pluggable IDE environment 105, such as the ECLIPSE software framework.

The URLs 125 associated with the URL-accessible IDE elements 120 can be written in accordance with a URL scheme 130. The URL scheme 130 can be a document that defines the valid syntax and components of the URLs 125. For example, the URL scheme 130 can define the syntax for the scheme name, the location of the URL-accessible IDE element, and additional data values. Multiple URL schemes 130 can be included within the software IDE 105 to accommodate a variety of URL 125 structures for different types of URL-accessible IDE elements 120 (e.g., a wizard scheme, a view scheme, et. al.).

Table 135 contains a set of example URLs 125. Table 135 can include a URL-accessible IDE element type 140, an example of a URL 125 for that element type 140, and the action 145 that can occur upon the execution of the URL 125. As shown in this table 135, an editor element type 140 can have a URL 125, "Resource://MyProject/MyProcess.bpel?action=open", which opens the default editor. Thus, the default editor can be accessed through this URL 125 without using the predefined commands of the software IDE 105.

Further, this example URL 125 can contain a scheme name, "Resource", an element location, "MyProject/MyProcess.bpel", and a set of data values, "action=open". These components of the URL 125 can be defined in the "Resource" URL scheme 130.

The URL operation tool 110 can be a software application that performs a variety of URL operations on the set of URL-accessible IDE elements 120. The operations performed by the URL operation tool 110 can include, but are not limited to, a launch URL operation, a bookmark URL operation, a share URL operation, a search operation, a save search operation, and a create URL shortcut operation. The URL operation tool 110 can include a URL editor 112, a search engine 114, and an operation interface 117.

The URL editor 112 can represent a software component in which URLs 125 can be written and associated with URL-accessible IDE elements 120. The URL editor 112 can validate entered URLs 125 against the URL scheme 130. Since URLs 125 are critical for the function of the present invention, it is advised that access to the URL editor 112 be limited to a select group of users, such as administrators.

In another embodiment, the URL editor 112 can be integrated into the functionality of the software IDE 105. In such an embodiment, the URL scheme 130 can be predefined by the software IDE 105 manufacturer and URLs 125 can be automatically generated and associated with the URL-accessible IDE elements 120.

The search engine 114 can represent a software algorithm that can search through the meta data 123 of the URL-accessible IDE elements 120 to determine which match a user-entered search string. The search engine 114 can generate a search results list that can be presented to a user in the operation interface 117. The search engine 114 can also utilize an internal relevancy score when ordering items in the search results list.

The operation interface 117 can represent a plurality of interfaces that allow for user interaction with the functions of the URL operation tool 110. For example, the operation interface 117 can include a search interface for accepting a search string, a search results interface for presenting the search results list, and so on. The operation interface 117 can provide access to the other components of the URL operation tool 110.

Figure 2:
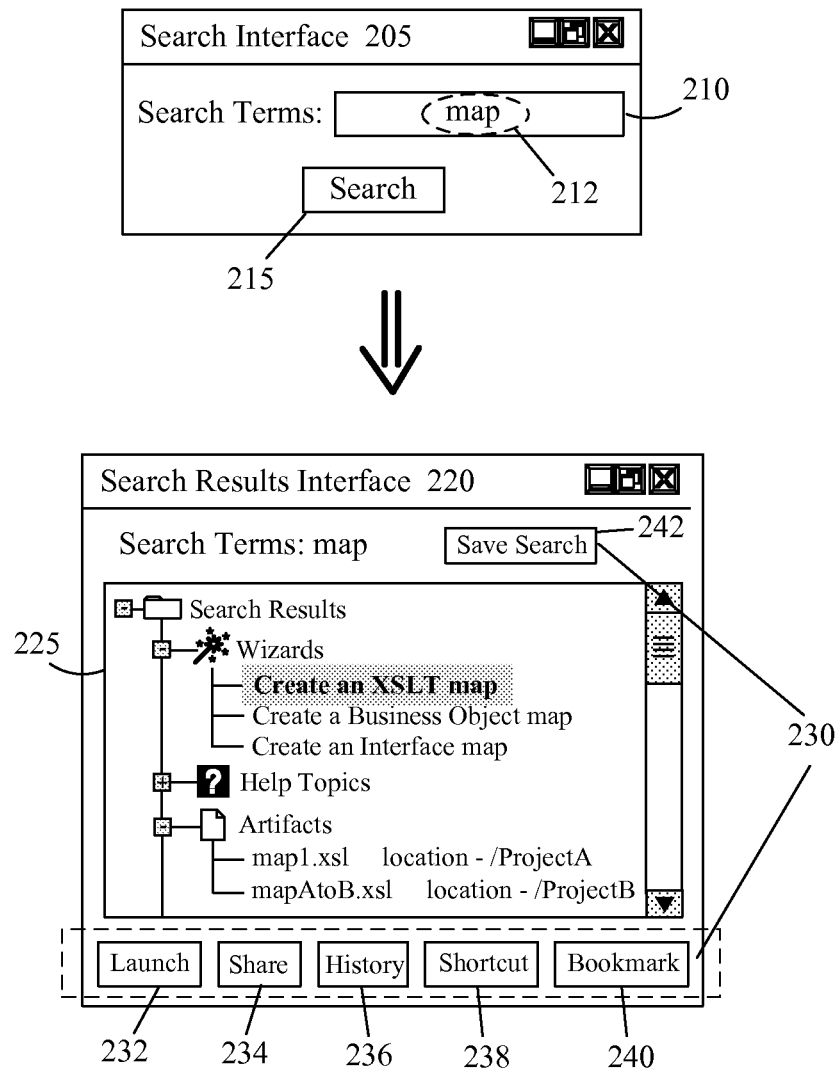
FIG. 2 is a collection of example interfaces of the URL operation tool in accordance with an embodiment of the inventive arrangements disclosed herein.

FIG. 2 is a collection 200 of example interfaces 205 and 220 of the URL operation tool in accordance with an embodiment of the inventive arrangements disclosed herein. The interfaces 205 and 220 of collection 200 can be a used by the URL operation tool 110 of system 100 or any other system tool that utilizes URLs to access software IDE elements.

Collection 200 can include a search interface 205 and a search results interface 235. It should be noted that additional interfaces can be included within the URL operation tool based on implementation, and that the interfaces 205 and 220 of collection 200 are not meant as a limitation of the present invention.

The search interface 205 can be a means by which a user can search the software IDE for elements that match an entered search string 212. The search interface 205 can include a text entry field 210 and a search button 215.

A user can enter a search string 212 into the text entry field 210. The search string 212 can contain alpha-numeric characters, words, and/or phrases that are related to the various elements of the software IDE. Additionally, the search string 212 can include BOOLEAN operators (i.e., AND, OR, etc.) to create relationships between the components of the search string 212, if supported by the underlying search engine. The underlying search engine can be invoked via the search button 215.

It should be noted that the search interface 205 shown in collection 200 is a simplistic example for illustration purposes. The search interface 205 can be elaborated upon to include a variety of additional search information, such as element type, date created, and the like.

The results of a search invoked in the search interface 220 can be presented in the search results interface 220. The search results interface 220 can include a results window 225 and a set of URL operations 230. The results window 225 can visually present search result information. In this example, the IDE elements in the search results are displayed in a tree control structure. Other display formats can be used, such as a display that mirrors a typical Web search results page.

Additionally, the elements listed in the results window 225 can be arranged by a relevancy value that can be determined by the underlying search engine when evaluating IDE elements. For example, wizards and editors can appear closer to the top of a search results list when a user enters the search string "create map".

A user can select a desired IDE element from the results window 225 and execute a URL operation 230. The set of URL operations 230 can represent a variety of operations that can be performed in the context of a URL framework, such as in a Web-based application. These URL operations 230 require that the IDE elements listed in the results window 225 have an associated URL, such as the URL-accessible IDE elements 120 of system 100.

In this example, the set of URL operations 230 includes a launch operation 232, a share operation 234, a history operation 236, a shortcut operation 238, a bookmark operation 240, and a save search operation 242. The launch operation 232 can invoke an IDE element from the results window 225 using the IDE element's URL, circumventing the traditional menu commands.

The share operation 234 can be a mechanism by which a user can share the URL of a selected IDE element. For example, an email message can be generated by the system that contains the element's URL, which the user can then address and send.

The history operation 236 can allow a user to access a historical log of accessed IDE elements. An entry to the user's historical log can be made when a user launches an IDE element from an interface of the URL operation tool. The history operation 236 can be likened to a similar feature contained in a Web browser.

The shortcut operation 238 can create a usable shortcut icon for the selected IDE element that can be used by the user to launch the software IDE and the requested IDE element.

The bookmark operation 240 can save the URL of the selected IDE element to a persistent list accessible to the user. The bookmark operation 240 can be implemented in a manner similar to a Web browser, but for use within a software IDE. The save search operation 242 can store an entered search string 212 for future use by a user.

Figure 3:
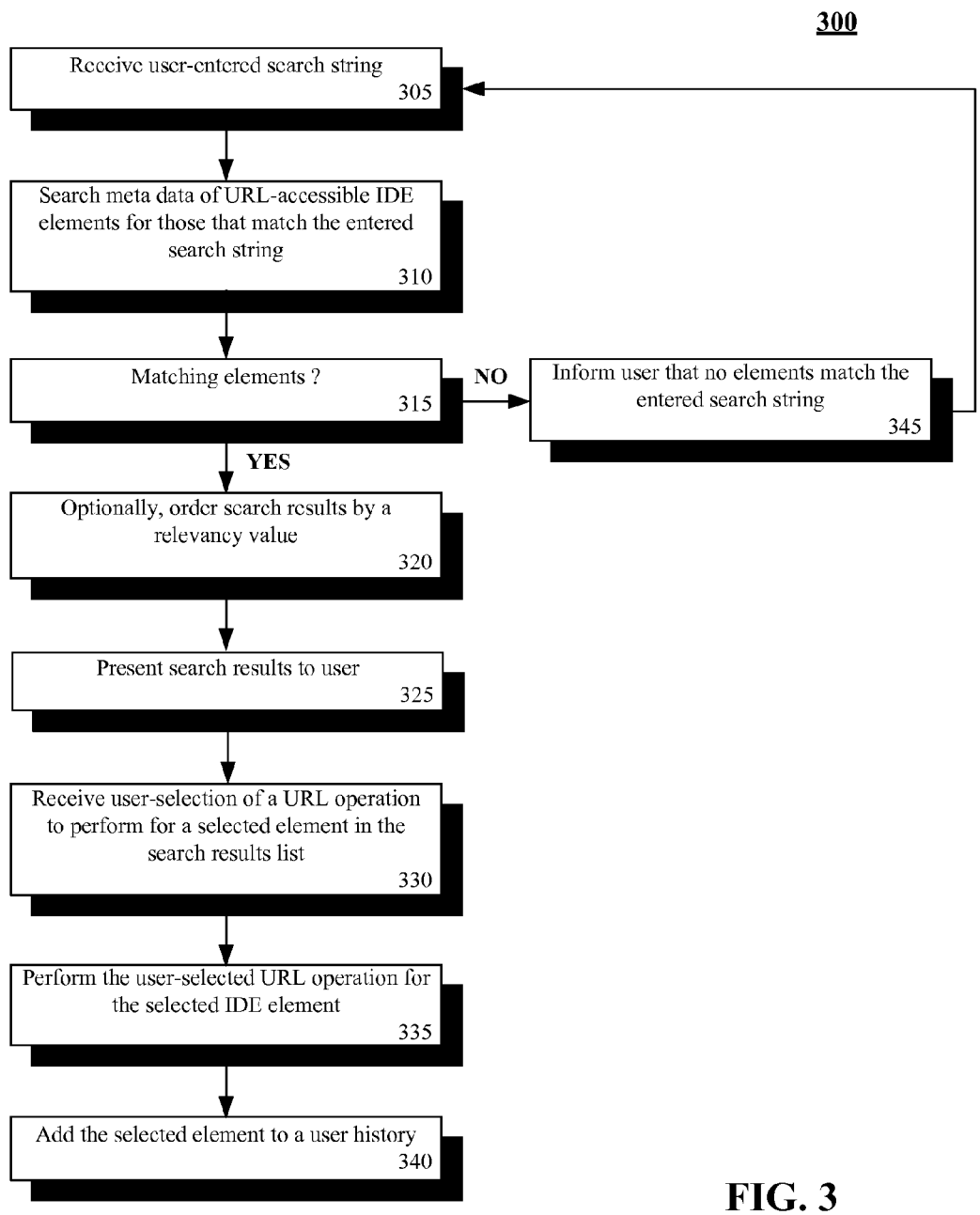
FIG. 3 is a flow chart of a method for searching and executing URL operations the elements of a software IDE in accordance with an embodiment of the inventive arrangements disclosed herein.

FIG. 3 is a flow chart of a method 300 for searching and executing URL operations the elements of a software IDE in accordance with an embodiment of the inventive arrangements disclosed herein. Method 300 can be performed within the context of system 100 and/or using the interfaces 205 and 220 of collection, or any other system configured to utilize URLs for accessing the elements of a software IDE.

Method 300 can begin with step 305 where a user-entered search can be received. In step 310, meta data associated with URL-accessible IDE elements can be searched to find those that match the user-entered search string of step 305.

The system can determine if matches for the search string exist in step 315. When matching elements do not exist, step 345 can execute where the user can be informed of the lack of matching elements. From step 345, flow can return to step 305 where the system can await the entry of another search string.

When matching elements exists, step 320 can optionally execute where the matching elements can be ordered by a relevancy value. In step 325, the search results can be presented to the user.

In step 330, a user-selection of a URL operation can be received for a selected IDE element in the search results. The user-selected URL operation can be performed in step 335. In step 340, the selected IDE element can be added to a user history.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for accessing elements of an integrated development environment (IDE) using uniform resource locators (URLs) comprising:
at least one computer receiving a user-entered search string;
the at least one computer querying meta data containing key words associated with a set of URL-accessible IDE elements of an IDE for matches to the user-entered search string, wherein each URL-accessible IDE element of the set of URL-accessible IDE elements includes a URL that provides a navigation-independent access mechanism;
the at least one computer, when the querying step finds at least one match, generating a search results list of matching URL-accessible IDE elements;
the at least one computer presenting the search results list, wherein the search results list includes at least one of a name, a description, and the URL of each matching URL-accessible IDE element in the search results list, and wherein a user-selection of one of the matching URL-accessible IDE elements from the search results list results in an operation within the IDE occurring that uses the selected one of the matching URL-accessible IDE elements from the search results list; and
the at least one computer logging an access of the selected one of the matching URL-accessible IDE elements from the search results list in a user history document.

2. The method of claim 1, further comprising:
the at least one computer receiving the user-selection of one of the matching URL-accessible IDE elements from the search results list; and
the at least one computer responsive to receiving the user-selection of one of the matching URL-accessible IDE elements, executing the operation within the IDE.

3. The method of claim 1, further comprising:
the at least one computer responsive to receiving the user-selection of one of the matching URL-accessible IDE elements, determining a URL associated with the user-selection of one of the matching URL-accessible IDE elements; and
the at least one computer triggering an execution of the operation within the IDE using the determined URL.

4. The method of claim 1, wherein the presenting step further comprises:
the at least one computer ordering the search results list by a relevancy value, wherein the relevancy value indicates a degree to which each matching URL-accessible IDE element relates to the user-entered search string.

5. The method of claim 1, wherein the operation within the IDE includes an invoke URL operation that occurs independent to a predefined invocation mechanism of the URL-accessible IDE element provided by the IDE, and wherein the predefined invocation mechanism represents a linear set of commands required to invoke the URL-accessible IDE element.

6. The method of claim 1, wherein the URL of the URL-accessible IDE element is written in accordance with a URL scheme, and wherein the URL scheme defines a syntax for at least a scheme name, an element location, and a set of data values.

7. The method of claim 1, wherein the operation within the IDE is a save search operation.

8. A method comprising:
at least one computer defining at least one uniform resource locator (URL) scheme, wherein the at least one URL scheme defines a syntax for at least a scheme name, a location, and a set of data values;
the at least one computer creating at least one URL in accordance with the at least one URL scheme, wherein the at least one URL provides a navigation-independent access mechanism for a member of a set of IDE (Integrated Development Environment) elements;
the at least one computer associating the at least one URL with an IDE element of the set of IDE elements within an IDE, wherein a one-to-one relationship exists between a URL and the IDE element, and wherein a URL-accessible IDE element is created; and
the at least one computer implementing a set of URL operations within the IDE that utilize the URL of URL-accessible IDE elements, wherein the set of URL operations comprise at least three of an invoke URL operation, a store URL operation, a search elements operation, a save search operation, a create URL shortcut operation, a view URL history operation, and a share URL operation.

9. A system for accessing elements of an integrated development environment (IDE) using uniform resource locators (URLs) comprising:
at least one processor; and
one or more computer memories storing a set of URL-accessible IDE elements, a set of URLs, and a URL operation tool;
wherein the set of URL-accessible IDE elements represent a plurality of functional objects within an IDE, and wherein each URL-accessible IDE element of the set of URL-accessible IDE elements includes a set of meta data containing key words that describe the URL-accessible IDE element;
wherein the set of URLs provide navigation-independent mechanisms to access the set of URL-accessible IDE elements within the IDE; and
wherein the URL operation tool comprises program instructions that are executable by the at least one processor to associate the set of URLs with the set of URL-accessible IDE elements and to execute a set of user-selectable URL operations upon the set of URL-accessible IDE elements within the IDE, and wherein the set of URL-accessible IDE elements are searchable from one or more search engines that match user-entered data against the set of meta data containing key words that describe the URL-accessing IDE element.

10. The system of claim 9, wherein the URL operation tool further comprises:
a URL editor configured to accept an entry of the set of URLs and associate the set of URLs with corresponding URL-accessible IDE elements.

11. The system of claim 9, wherein the URL operation tool further comprises:
an operation interface configured to accept the user-entered data, wherein the user-entered data is at least one of a search string, a user-selectable URL operation, and a URL-accessible IDE element.

12. The system of claim 9, wherein the URL operation tool further comprises:
a search engine configured to generate a search results list of URL-accessible IDE elements by querying the set of meta data of the set of URL-accessible IDE elements for matches to the user-entered data, wherein the search results list is presented within an operation interface.

13. The system of claim 9, wherein the set of user-selectable URL operations include an invoke URL operation that occurs independent to a predefined invocation mechanism of the URL-accessible IDE element provided by the IDE, and wherein the predefined invocation mechanism represents a linear set of commands required to invoke the URL-accessible IDE element.

14. The system of claim 9, wherein the set of user-selectable URL operations includes a store URL operation, a search elements operation, and a save search operation.

15. The system of claim 9, further comprising:
a URL scheme defining a syntax for at least a scheme name, an element location, and a set of data values, wherein the set of URLs are written in accordance with the URL scheme, wherein a search results list includes at least one of a name, a description, and the URL for each URL-accessible IDE element in the search results list, wherein the URL scheme is written in a standardized format that allows compatibility with an ancillary standardized URL scheme, and wherein the ancillary standardized URL scheme includes an extensible resource identifier (XRI) scheme and an internationalized resource identifier (IRI) scheme.

16. The system of claim 9, wherein the set of URL-accessible IDE elements are included in a user customized Web page, and wherein the user customized Web page functions as a custom interface of the IDE.

17. The system of claim 9, wherein the set of URL-accessible IDE elements include an IDE artifact and a wizard tool.

* * * * *